(12) United States Patent
Lopez

(10) Patent No.: US 11,746,734 B2
(45) Date of Patent: Sep. 5, 2023

(54) ELECTRONIC UNIT INJECTOR SHUTTLE VALVE

(71) Applicant: Progress Rail Services Corporation, Albertville, AL (US)

(72) Inventor: Rolando Lopez, Lehigh Acres, FL (US)

(73) Assignee: Progress Rail Services Corporation, Albertville, AL (US)

( * ) Notice: Subject to any disclaimer, the term of this patent is extended or adjusted under 35 U.S.C. 154(b) by 0 days.

(21) Appl. No.: 16/110,667

(22) Filed: Aug. 23, 2018

(65) Prior Publication Data

US 2020/0063703 A1 Feb. 27, 2020

(51) Int. Cl.
*F02M 63/00* (2006.01)
*F16K 3/24* (2006.01)
*F02M 51/06* (2006.01)

(52) U.S. Cl.
CPC ...... *F02M 63/0021* (2013.01); *F02M 51/061* (2013.01); *F02M 63/0071* (2013.01); *F16K 3/24* (2013.01)

(58) Field of Classification Search
CPC ............. F02M 63/0021; F02M 51/061; F02M 63/0071; F02M 47/027; F16K 3/24
See application file for complete search history.

(56) References Cited

U.S. PATENT DOCUMENTS

| | | | | |
|---|---|---|---|---|
| 4,185,779 A | * | 1/1980 | Watson | F02M 57/025 123/472 |
| 4,408,718 A | | 10/1983 | Wich | |
| 4,541,394 A | * | 9/1985 | Schechter | F02M 59/366 123/506 |
| 4,583,509 A | * | 4/1986 | Schechter | F02M 59/366 417/442 |
| 4,953,589 A | | 9/1990 | Nakamura | |
| 5,271,430 A | * | 12/1993 | Muruyama | F16K 3/24 137/484.4 |
| 5,311,850 A | | 5/1994 | Martin | |
| 5,605,134 A | | 2/1997 | Martin | |
| 6,068,236 A | | 5/2000 | Espey | |

(Continued)

FOREIGN PATENT DOCUMENTS

| | | | |
|---|---|---|---|
| DE | 102011004186 A1 * | 8/2012 | ......... F02M 63/0071 |
| EP | 1584815 | 10/2005 | |

(Continued)

*Primary Examiner* — Long T Tran

(57) ABSTRACT

A shuttle valve for a control valve coupled to an electronic fuel injector is disclosed. The shuttle valve may include a shuttle valve first end including an armature attachment portion operably coupled to an armature of the control valve and a shuttle valve second end opposite the shuttle valve first end defining a sealing portion of the control valve including an annular sealing surface. A valve guide portion may extend axially along a portion of the shuttle valve between the first and second ends. Furthermore, an engagement surface portion may be defined along the valve guide portion that is slidably engaged with a valve bore. Moreover, the shuttle valve may include a non-engagement surface portion defined along the valve guide portion, wherein the non-engagement surface is a non-continuous surface around a circumference of the valve guide portion and wherein the non-engagement surface is interspersed between portions of the engagement surface.

15 Claims, 4 Drawing Sheets

(56) References Cited

U.S. PATENT DOCUMENTS

| | | | | |
|---|---|---|---|---|
| 6,089,470 | A * | 7/2000 | Teerman | F02M 57/023 239/88 |
| 6,397,890 | B1 * | 6/2002 | Mickelson | F15B 13/0402 137/625.34 |
| 6,923,388 | B2 * | 8/2005 | Buehler | F02M 61/047 239/533.12 |
| 7,090,151 | B2 * | 8/2006 | Potschin | F02M 47/027 239/533.1 |
| 7,179,060 | B2 * | 2/2007 | Sommars | F02M 63/0225 123/506 |
| 7,721,416 | B2 * | 5/2010 | Rodriguez-Amaya | F02M 57/023 29/607 |
| 9,435,309 | B2 * | 9/2016 | Teerman | F02M 57/023 |
| 9,890,747 | B2 * | 2/2018 | Williams | F02M 25/0872 |
| 2015/0176555 | A1 | 6/2015 | Yudanov | |
| 2015/0361935 | A1 * | 12/2015 | Nakaoka | F02M 37/0023 417/437 |

FOREIGN PATENT DOCUMENTS

| | | | | |
|---|---|---|---|---|
| EP | 1967726 | A2 * | 9/2008 | F02M 47/027 |
| EP | 2235356 | B1 | 10/2015 | |
| WO | WO-2008098806 | A1 * | 8/2008 | F02M 47/027 |
| WO | WO-2010023009 | A1 * | 3/2010 | F02M 47/027 |
| WO | 2012136429 | A1 | 10/2012 | |

\* cited by examiner

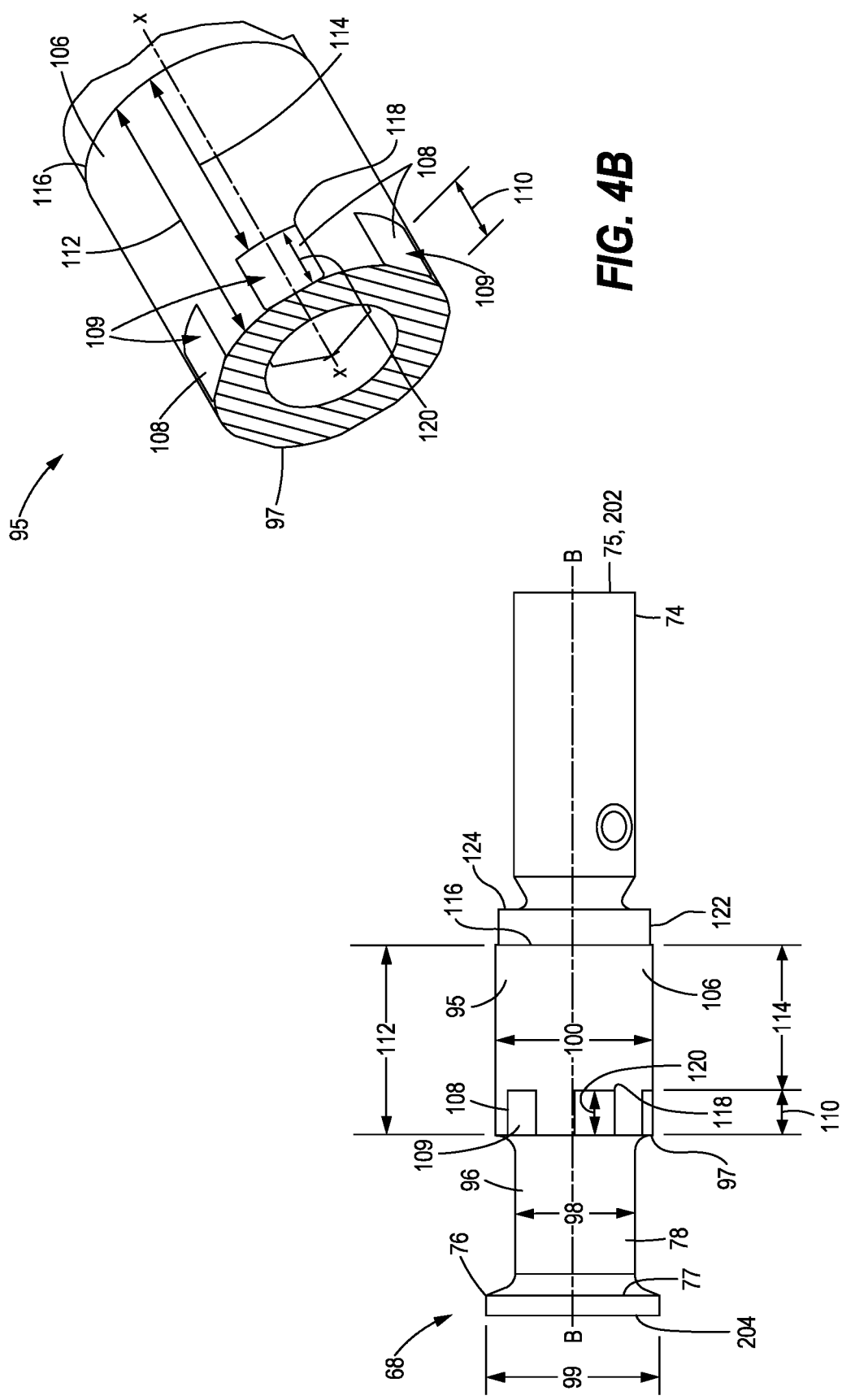

ELECTRONIC UNIT INJECTOR SHUTTLE VALVE

TECHNICAL FIELD

The present disclosure generally relates to actuator assemblies for engines and, more particularly, relates to actuator assemblies that incorporate hydraulic lash adjusters and non-hydraulic lash adjusters used to adjust engine valve assemblies.

BACKGROUND

Each cylinder of an engine, for example a diesel engine, is equipped with one or more fuel injectors that may be selectively controlled to supply fuel to one or more cylinders of the engine. The fuel injectors may be operatively coupled to a control valve which may be selectively controlled by way of an actuator assembly. Furthermore, the control valve may include a shuttle valve that resides within a control valve enclosure and the actuator assembly, as well as a valve spring, may be used to actuate (i.e., open and close) the shuttle valve during operation. For example, activation of the actuator assembly may cause axial movement of the shuttle valve within a valve bore such that the shuttle valve abuts against a sealing surface to close the fuel flow. Conversely, de-activation of the actuator assembly allows the valve spring to bias the shuttle valve into an open position. With the shuttle valve in the open position, the control valve delivers fuel to the fuel injector for injection into the engine cylinder.

During engine operation, the control valve may be repeatedly cycled to open and close the shuttle valve in order to deliver the appropriate amount of fuel to the engine. This repeated cycling of the control valve may cause wear and tear and tear on the shuttle valve and other control valve components. Additionally, there is a continuous push to improve fuel efficiency of internal combustion engines while reducing the environmental impact of engine combustion by-products. Accordingly, control valve and shuttle valve designs that improve performance of the fuel injectors may also help extend the useable life of the injector and improve overall performance of internal combustion engines.

U.S. Pat. No. 6,089,470 (hereinafter the "'470 patent.") describes a fuel control valve assembly. A cylindrical valve stem and cylindrical guide bore is disclosed in the '470 patent that includes an increase in the radial clearance and reduction in guide length between the valve stem and guide bore. However, over relaxation of the radial clearance and reduction of the guide length may result in leaks or the creation of pressure relief pathways during the life of the fuel control valve assembly.

While arguably effective for its intended purpose, improvements beyond the '470 patent continue to be sought in the engine industry. It is with respect to these considerations and others made by the disclosure that is herein presented.

SUMMARY OF THE DISCLOSURE

In accordance with one aspect of the disclosure, a shuttle valve for a control valve coupled to an electronic fuel injector is disclosed. The shuttle valve may include a shuttle valve first end including an armature attachment portion operably coupled to an armature of the control valve. Additionally, the shuttle valve may include a shuttle valve second end opposite the shuttle valve first end, the shuttle valve second end defining a sealing portion of the control valve including an annular sealing surface. Furthermore, the shuttle valve may include a valve guide portion axially extending along a portion of the shuttle valve between the shuttle valve first end and the shuttle valve second end. The shuttle valve may further include an engagement surface portion defined along the valve guide portion, the engagement surface configured to slidably engage with a valve bore defined within the control valve. Moreover, the shuttle valve may include a non-engagement surface portion defined along the valve guide portion, wherein the non-engagement surface is a non-continuous surface around a circumference of the valve guide portion and wherein the non-engagement surface is interspersed between portions of the engagement surface.

In accordance with another aspect of the disclosure, a control valve for an electronic fuel injector that selectively controls an amount of fuel supplied to the electronic fuel injector is disclosed. The control valve may have a fuel injector body including a valve bore extending through at least a portion of the fuel injector body. Furthermore, the control valve may include an actuator that is selectably controllable to actuate the control valve in order to deliver the amount of fuel to the fuel injector. A bushing may be inserted into the valve bore and a shuttle valve may be slidingly engaged with the bushing. Moreover, the shuttle valve may be operably coupled to an armature of the actuator such that actuation of the actuator causes an axial movement of the shuttle valve with respect to the bushing. The shuttle valve incorporated into the control valve may include a shuttle valve first end including an armature attachment portion to operably couple the shuttle valve to the armature and a shuttle valve second end opposite the shuttle valve first end, the shuttle valve second end defining an annular sealing surface of the shuttle valve. Additionally, a valve guide portion may axially extend along a portion of the shuttle valve between the shuttle valve first end and the shuttle valve second end. Moreover, the shuttle valve may include an engagement surface portion defined along the valve guide portion, and the engagement surface may be configured to slidably engage with the bushing inserted within the valve bore. A non-engagement surface portion may be further defined along the valve guide portion, wherein the non-engagement surface is a non-continuous surface circumferentially defined around the valve guide portion and wherein the non-engagement surface is interspersed between portions of the engagement surface.

In accordance with yet another aspect of the disclosure, an internal combustion engine including a fuel system configured to deliver a fuel supply to a plurality of engine cylinders is disclosed. The internal combustion engine may include a plurality of electronic fuel injectors and each electronic fuel injector of the plurality of electronic fuel injectors may include an injector body which is fluidly coupled to the fuel system and each engine cylinder of the plurality of cylinders. Additionally, the internal combustion engine may include a control valve integrated with the injector body of each electronic fuel injector of the plurality of electronic fuel injectors to selectively control the fuel supply delivered to the plurality of engine cylinders. Furthermore, the control valve of the internal combustion engine may include a valve bore extending through at least a portion of the fuel injector body and a bushing inserted into the valve bore. Moreover, a shuttle valve may extend axially through the valve bore and slidingly engaged with the bushing. The control valve may further include an actuator that is selectably controllable to actuate the control valve to deliver the fuel supply to each electronic fuel injector of the plurality of fuel injectors. An actuator armature may be operably coupled to a shuttle valve first end such that actuation of the actuator causes an axial movement of the shuttle valve with respect to the bushing. Furthermore, the control valve may include an annular sealing surface defined at a shuttle valve second end opposite the shuttle valve first end. A valve guide portion may axially extend along a portion of the shuttle valve between the shuttle valve first end and the shuttle valve second end. Moreover, the shuttle valve may include an engagement surface portion defined along the valve guide portion, and the engagement surface may be configured to slidably engage with the bushing inserted within the valve bore. A non-engagement surface portion may be further defined along the valve guide portion, wherein the non-engagement surface is a non-continuous surface circumferentially defined around the valve guide portion and wherein the non-engagement surface is interspersed between portions of the engagement surface.

BRIEF DESCRIPTION OF THE DRAWINGS

FIG. 4A is a perspective view of an exemplary shuttle valve, in accordance with an embodiment of the present disclosure;

FIG. 4B is an enlarged perspective view of a valve guide portion of the shuttle valve of FIG. 4A, in accordance with an embodiment of the present disclosure.

DETAILED DESCRIPTION

Figure 1:
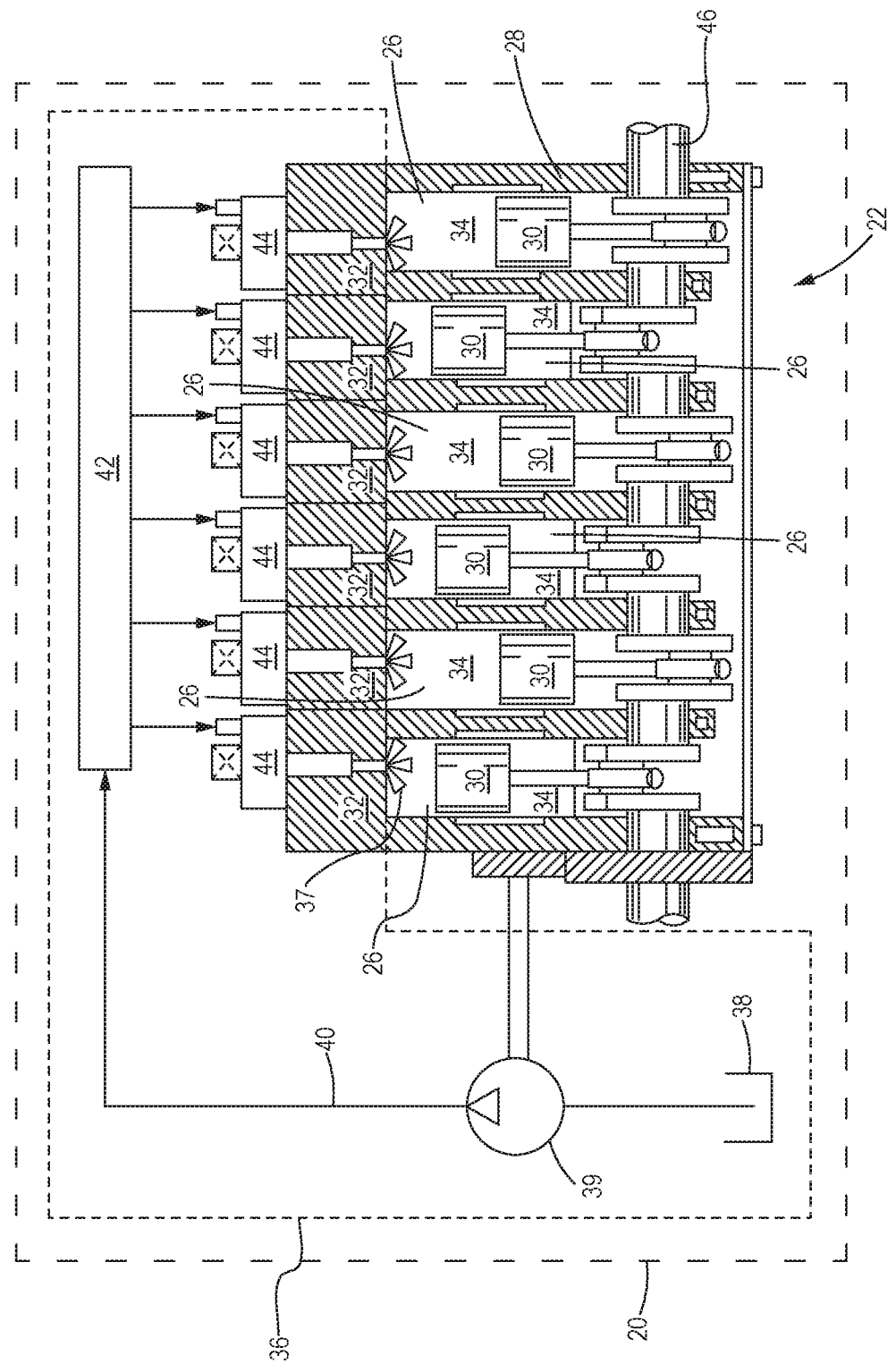
FIG. 1 is a schematic view of an engine incorporated into a machine, in accordance with an embodiment of the present disclosure.

Referring now to the drawings and with specific reference to FIG. 1, a machine 20 including an engine 22 is shown, in accordance with certain embodiments of the present disclosure. While one non-limiting example of the machine 20 may be a locomotive, it will be understood the machine 20 may include other types of fixed or mobile equipment such as but not limited to, an off-road truck, an on-road truck, a track-type machine, a motor grader, industrial mining equipment, an automobile, a marine vessel, electricity generating equipment, and any other such machine or piece of equipment. Moreover, the engine 22 may be a diesel engine, a gasoline engine, a natural gas engine, a hybrid engine or any combination thereof. Furthermore, the engine 22 may serve as a primary or secondary power generating source that produces the operational power used to operate the machine 20.

As discussed above, the engine 22 may be a diesel engine that includes one or more cylinders 26 defined in an engine block 28. As shown in FIG. 1, one non-limiting example of the engine 22 includes six cylinders 26, but it will be understood that an alternative (i.e., fewer or greater) number of cylinders 26 may be included in the engine 22. Furthermore, each cylinder 26 includes a piston 30 that is slidably engaged with an interior surface of the cylinder 26 and a cylinder head 32 positioned on top of each cylinder 26. As a result, the cylinder head 32 may define an interior chamber 34 (e.g., combustion chamber), that houses the piston 30 of each cylinder 26 and the cylinder head 32 covers or otherwise encloses the interior chamber 34. The engine 22 may further include a fuel system 36 which delivers a fuel supply 37 to the interior chamber 34 of each cylinder 26. The fuel supply 37 delivered to the engine 22 may be stored in bulk within a fuel tank 38 and the fuel system 36 may include one or more fuel pumps 39 that transport the fuel supply 37 through a fuel line 40 that is in fluid communication between the fuel tank 38 and each cylinder 26 of the engine 22. In some embodiments, the fuel system 36 may further include a fuel distribution rail 42 that distributes the fuel supply 37 to the plurality of fuel injectors 44 and the fuel supply 37 is injected into the interior chamber 34 by the fuel injector 44 associated with each cylinder 26.

The desired amount of the fuel supply 37 injected into the interior chamber 34 may be subsequently ignited and combusted within the interior chamber 34. The combustion of the fuel supply 37 produces combustion gas which acts upon each piston 30 causing the piston 30 to reciprocate (i.e., move up and down) within the interior chamber 34. In some embodiments, each piston 30 may be operably coupled to a rotating crank shaft 46 that is driven by the reciprocation of each piston 30 of the engine 22. The rotation of the crank shaft 46 may then be used to drive other components of the machine 20.

Figure 2:
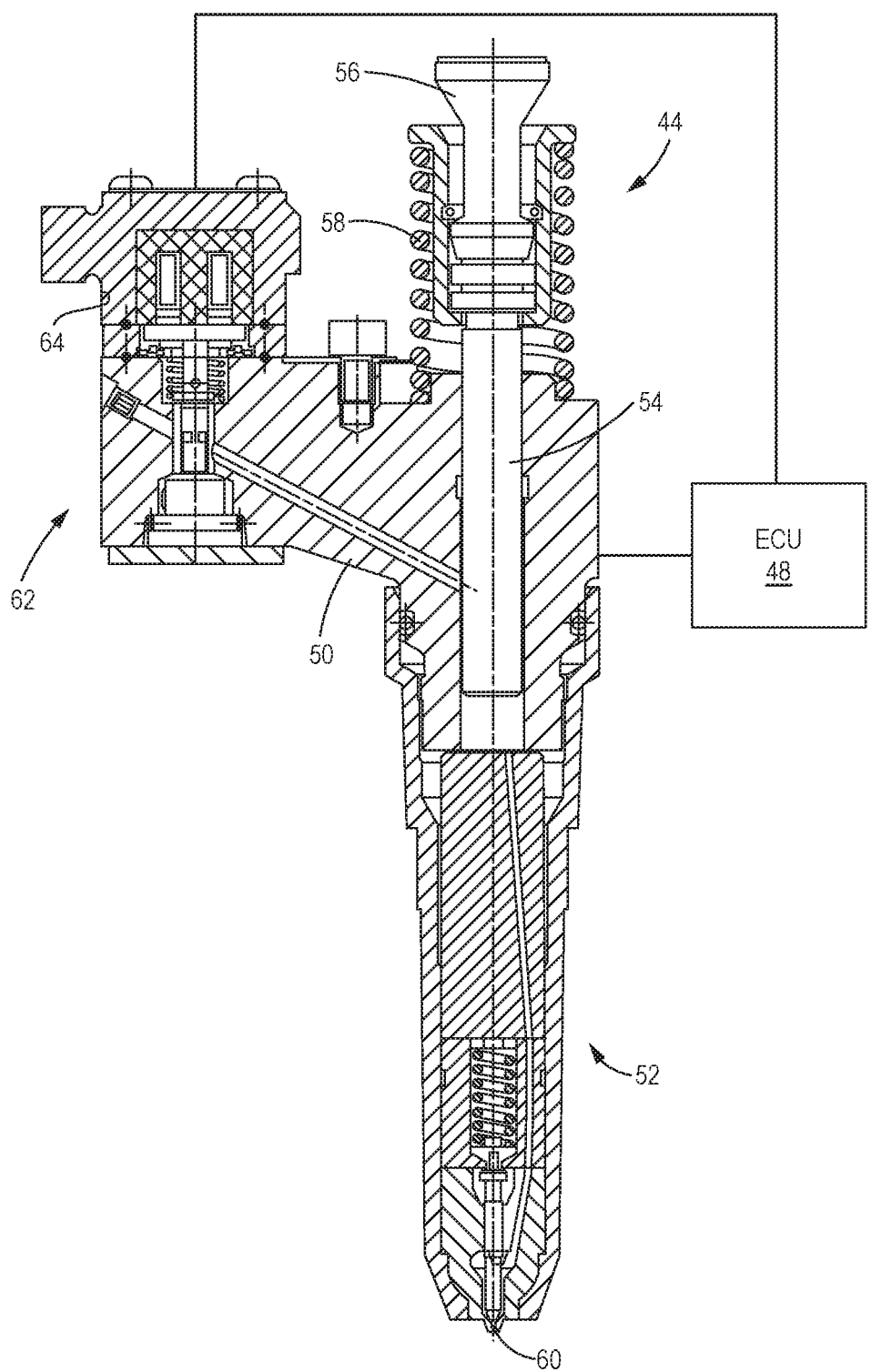
FIG. 2 is a cross-sectional view of an electronic fuel injector incorporated into the engine of FIG. 1, in accordance with an embodiment of the present disclosure.

Referring now to FIG. 2, a cross-sectional view of an exemplary fuel injector 44 incorporated into each cylinder 26 of the engine 22 of FIG. 1 is shown. In some embodiments, the fuel injector 44 may be configured as an electronic unit injector (EUI) which is in electronic communication with an electronic control unit 48 (ECU). The ECU 48 may be programmed to transmit control signals to the fuel injector 44 in order to inject or otherwise deliver the desired amount of the fuel supply 37 to each cylinder 26 and interior chamber 34. Furthermore, the fuel injector 44 may include an injector body 50 that includes an injector nozzle assembly 52 disposed therein. The injector nozzle assembly 52 may further include an injector plunger 54 operably coupled to an injector actuator portion 56. Furthermore an injector spring 58 and actuator (not shown) may be operably coupled to the injector actuator portion 56 such that the injector actuator portion 56 moves axially (e.g., up and down) in response to the actuator (not shown) and the injector spring 58.

Additionally, the injector nozzle assembly 52 includes a nozzle tip 60 that dispenses or injects the fuel supply 37 into the interior chamber 34 of each cylinder 26. As shown in FIG. 1, the fuel supply 37 may be injected in a plurality of directions within the interior chamber 34. Therefore, the nozzle tip 60 may be configured as a spray-type nozzle which dispenses the fuel supply 37 in a plurality of fine droplets to facilitate efficient combustion of the fuel supply 37 within the interior chamber 34 of the cylinder 26. The fuel injector 44 may further include a control valve 62 integrated with the injector body 50 and the control valve 62 is configured to deliver the desired amount of fuel supply 37 to each fuel injector 44. Furthermore, the control valve 62 may also be in electronic communication with the ECU 48, either via an internal connection (not shown) through the injector body 50 or an external connection. Moreover, the ECU 48 may be programmed to send a control signal to open and/or close the control valve 62 to increase and/or decrease the fuel supply 37 delivered to the fuel injector 44. In one non-limiting example, the ECU 48 may send a control signal to open the control valve 62 which subsequently allows fuel to be transported (i.e., pumped) through the fuel system 36 to the one or more fuel injectors 44 such that the fuel supply 37 is injected into the interior chamber 34 of each cylinder 26. Alternatively, the ECU 48 may send a control signal to close the control valve 62 such that the transportation of fuel through the fuel system 36 to the fuel injectors 44 is halted and no fuel is injected into the interior chamber 34 of each cylinder 26.

Figure 3:
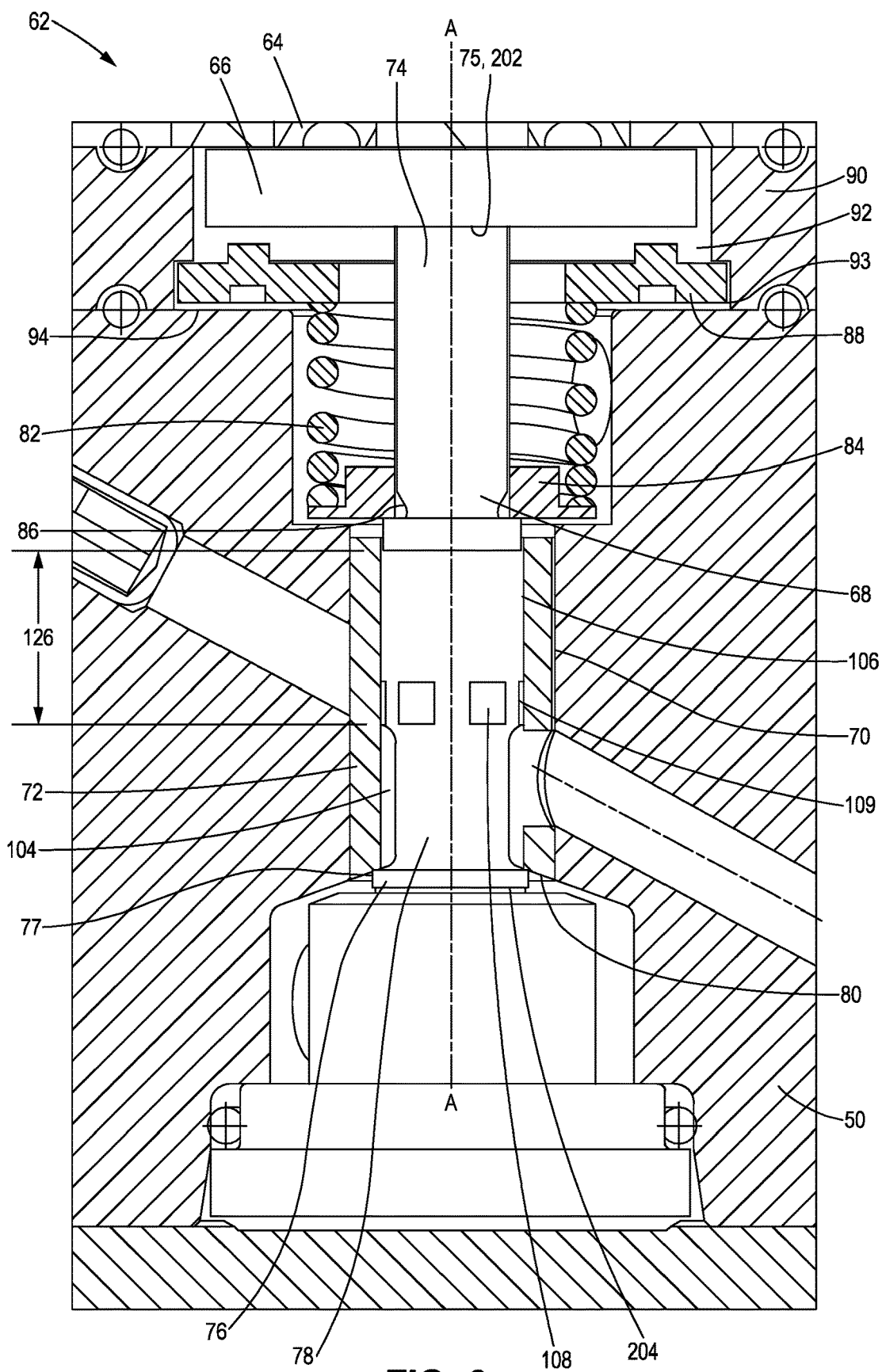
FIG. 3 is an enlarged cross-sectional view of a control valve incorporated into the electronic fuel injector of FIG. 2, in accordance with an embodiment of the present disclosure.

Referring now to FIG. 3, with continued reference to FIGS. 1 and 2, a partial cross-section of the control valve 62 is shown in greater detail. In one non-limiting example, the control valve 62 may be an electromagnetically actuated valve that includes an actuator 64, such as but not limited to a solenoid, and an armature 66. Furthermore, a shuttle valve 68 may be slidingly disposed within a valve bore 70 formed within the injector body 50. In some embodiments, a bushing 72 may be press fit or otherwise inserted into at least a portion the valve bore 70. Moreover, the shuttle valve 68 may extend through the bushing 72 and at least a portion of shuttle valve 68 may be slidingly engaged with an inner surface of the bushing 72. Accordingly, when the control valve 62 is activated and/or deactivated the shuttle valve 68 may slide axially along an axis A-A with respect to the bushing 72.

Furthermore, a first end 74 of the shuttle valve 68 may include an armature attachment portion 75 at a top tip 202 of the shuttle valve 68, the armature attachment portion 75 is operably coupled to the armature 66 by an armature fastener (not shown), such as but not limited to a screw. Moreover, a sealing portion 76 including an annular sealing surface 77 is defined at a second end 78 opposite the first end 74 of the shuttle valve 68, and specifically, the annular sealing surface 77 is defined at a bottom tip 204 of the shuttle valve 68. The annular sealing surface 77 may sealingly engage with a sealing surface 80 of the bushing 72 to form a fluid tight seal between the shuttle valve 68 and the bushing 72 when the shuttle valve 68 is actuated or otherwise controlled into a closed position. Furthermore, the control valve 62 may include a valve spring 82 that circumferentially surrounds at least a portion of the shuttle valve 68. Additionally, a spring seat 84 may be operatively engaged with a shoulder portion 86 of the shuttle valve 68 and a spring retainer 88 may be positioned within the control valve 62 such that the spring retainer 88 is spaced an axial distance away from the spring seat 84 along the axis A-A. Accordingly, the valve spring 82 may be disposed between the spring seat 84 and the spring retainer 88 with one end of the valve spring 82 in direct contact with the spring seat 84 and the opposite end of the valve spring 82 in direct contact with the spring retainer 88. The valve spring 82 may compress and/or expand between the spring seat 84 and the spring retainer 88 during opening and/or closing of the shuttle valve 68.

The control valve 62 may further include an actuator spacer portion 90 defining a spacer cavity 92 therein. The spring retainer 88 and the armature 66 may each be positioned within the spacer cavity 92 and separated or spaced apart an axial distance along the axis A-A of the control valve 62. Furthermore, a portion of the spring retainer 88 may be inserted into a retaining groove 93 formed adjacent to a first end 94 of the actuator spacer portion 90 such that the retaining groove 93 holds or otherwise positions the spring retainer 88 in a fixed position within the spacer cavity 92. The armature 66 may be movably located within the spacer cavity 92 such that the armature 66 may move axially within the spacer cavity 92 when the actuator 64 is energized and/or de-energized.

Referring now to FIG. 4A, an exemplary shuttle valve 68 is shown that may be incorporated into the control valve 62 shown in FIGS. 2-3. In an embodiment, the shuttle valve 68 defines a generally cylindrical structure extending between the first end 74 and the second end 78 of the shuttle valve 68. As discussed above, the first end 74 of the shuttle valve 68 may include the armature attachment portion 75 while the sealing portion 76 and the annular sealing surface 77 is defined at the second end 78 of the shuttle valve 68. Moreover, the annular sealing surface 77 may have a beveled surface that is complimentary to a beveled surface defined on the sealing surface 80 of the bushing 72. Accordingly, when the annular sealing surface 77 of the shuttle valve 68 and the sealing surface 80 of the bushing 72 are in direct contact with one another the complimentary annular sealing surface 77 and sealing surface 80 of the bushing 72 may interact with one another such that a fluid tight seal is formed therebetween.

Furthermore, the shuttle valve 68 may include a valve guide portion 95 which extends a specified axial distance along an axis B-B between the first end 74 and the second end 78 of the shuttle valve 68. Moreover, the shuttle valve 68 further includes a neck portion 96 disposed between the second end 78 of the shuttle valve 68 and a first end 97 of the valve guide portion 95. The neck portion 96 may have a diameter 98 that is smaller than a diameter 99 of the second end 78 of the shuttle valve 68 and a diameter 100 of the valve guide portion 95. Accordingly, the diameter 98 of the neck portion 96 may also be smaller than an inner diameter 102 of the bushing 72 (see FIG. 3). As a result, a valve chamber 104 may be defined between the bushing 72 and the neck portion 96 of the shuttle valve 68. In an embodiment, the valve chamber 104 may extend along the axial length of the neck portion 96 between the second end 78 of the shuttle valve 68 and the valve guide portion 95; however other lengths of the valve chamber 104 are possible.

Moreover, as shown in FIGS. 3 and 4A, the diameter 100 of the valve guide portion 95 may be slightly smaller than the inner diameter 102 of the bushing 72. In one non-limiting example, the diameter 100 of the valve guide portion 95 is sized such that an engagement surface 106 of the valve guide portion 95 is slidingly engaged with the inner surface of the bushing 72 and the shuttle valve 68 is capable of moving axially along the axis A-A of the control valve 62 with respect to the bushing 72 while the lateral movement of the shuttle valve 68 with respect to the bushing 72 is kept to a minimum. This axial movement of the valve guide portion 95 with respect to the bushing 72 may be referred to as the stroke length of the shuttle valve 68 during the actuation or operation of the control valve 62.

Accordingly, referring now to FIG. 4B, with continued reference to FIGS. 3-4A, an enlarged perspective view of the valve guide portion 95 of the shuttle valve 68 is shown. In an embodiment, the valve guide portion 95 includes a plurality of notches 108 circumferentially formed around the valve guide portion 95. Moreover, the notches 108 may each have a notch surface 109 that is recessed into the valve guide portion 95 with respect to the engagement surface 106 such that the notch surface 109 is not in the same plane as the engagement surface 106. Additionally, as illustrated in FIG. 3, when the shuttle valve 68 is press fit into the bushing 72 the notch surface 109 does not contact the inner surface of the bushing 72. Furthermore, the plurality of notches 108 are periodically arrayed around the circumference of the valve guide portion 95 such that the first non-engagement portion 110 is defined as a non-continuous surface adjacently positioned to the first end 97 of the valve guide portion 95.

As further illustrated in FIGS. 2-4B, the notches 108 may reduce the surface area of the engagement surface 106 because the area of the non-engagement portion 110 defined by the notch surface 109 of the notches 108 does not engage or directly come into contact with the interior surface of the bushing 72. As a result, the engagement surface 106 may have a plurality of lengths that extend along the valve guide portion 95. In one non-limiting example, the engagement surface 106 has a first engagement surface length 112 and a second engagement surface length 114. As shown in FIGS. 4A and 4B, the first engagement surface length 112 extends from the first end 97 of the valve guide portion 95 to an engagement surface end 116 defined at a location along the valve guide portion 95. Conversely, the second engagement surface length 114 may be shorter than the first engagement surface length 112. For example, the second engagement surface length 114 may extend from an engagement surface location 118 that is axially interior from the first end 97 of the valve guide portion 95 to the engagement surface end 116. Put another way, the second engagement surface length 114 may be equal an axial length 120 of the notch surface 109 subtracted from the first engagement surface length 112.

As further shown in FIG. 4A, the valve guide portion 95 may include a second non-engagement portion 122 that may circumferentially surround a portion of the valve guide portion 95. In one non-limiting example, the second non-engagement portion 122 may be a continuous annular region which extends from the engagement surface end 116 to a second end 124 of the valve guide portion 95.

INDUSTRIAL APPLICABILITY

The present disclosure generally relates to fuel injectors for an engine, and more particularly, relates to a control valve including a shuttle valve which is selectably operated to deliver and inject a desired amount of fuel into the engine cylinders. By providing the control valve with a shuttle valve which has a first non-engagement surface periodically arrayed around the circumference of a valve guide portion and a second non-engagement surface continuously around the circumference of the valve guide portion, the performance of the control valve may be improved. For example, the first and second non-engagement surfaces may reduce the engagement surface area between the valve guide portion and the bushing. Such surface area reduction may help improve the sealing performance between the bushing and the shuttle valve. Furthermore, incorporating at least two different engagement lengths of the engagement surface along the valve guide portion may help reduce wear of the shuttle valve. As a result, the shuttle valve as discussed herein may provide a variety of performance improvements, such as but not limited to, minimizing performance variation of fuel injector, extending the usable life of the fuel injector, improving the sealing performance, optimizing the engagement length of the shuttle valve engagement surface, reducing the needle response time of the fuel injector, improving fuel efficiency and emissions and other such benefits.

As discussed above, the valve guide portion 95 along the shuttle valve 68 may include an optimized surface area of the engagement surface 106. More specifically, an embodiment of the shuttle valve 68 includes the plurality of notches 108 arrayed around the first end 97 of the valve guide portion 95 to define the first non-engagement portion 110 of the valve guide portion 95. Moreover, the plurality of notches 108 may extend a distance of at least 2 millimeters from the first end 97 of the valve guide portion 95 interiorly towards the engagement surface end 116. As a result, the first non-engagement portion 110 is non-continuously or intermittently defined circumferentially around a portion of the valve guide portion 95 that is adjacent to the first end 97. As a result, the first non-engagement portion 110 reduces the surface area of the engagement surface 106 of the valve guide portion 95. In other words, the notches 108 reduce the area of the valve guide portion 95 that contacts and is slidingly engaged with the bushing 72. Moreover, the intermittent positioning of the notches 108 may produce the desired surface area reduction while simultaneously defining at least two different engagement lengths along the valve guide portion 95.

In some embodiments, the plurality of notches 108 are arrayed or otherwise arranged with a portion of the engagement surface 106 extending between and separating adjacent notches 108. As a result, the engagement surface 106 between the notches 108 defines a first engagement surface length 112 of the valve guide portion 95 that extends from the first end 97 of the valve guide portion 95 to the engagement surface end 116. Moreover, the engagement surface 106 where notches 108 are present defines a second engagement surface length 114 that extends from an interior engagement surface location 118 to the engagement surface end 116. In one non-limiting example, the interior engagement surface location 118 is axially interior from the first end 97 of the valve guide portion 95 and the second engagement surface length 114 is shorter than the first engagement surface length 112. The different engagement surface lengths 112, 114 may help improve sealing performance of the shuttle valve 68 because the first engagement length 112 of the engagement surface 106 minimizes a pressure relief pathway 126 (see FIG. 2) between the shuttle valve 68 and the bushing 72.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A control valve coupled to an electronic fuel injector, the control valve having a shuttle valve comprising:
  a shuttle valve top end including an armature attachment portion operably coupled to an armature of the control valve;
  a shuttle valve bottom end opposite the shuttle valve top end, the shuttle valve bottom end defining a sealing portion of the control valve including a shuttle valve terminal end surface and an annular sealing surface;
  a valve guide portion axially extending along a portion of the shuttle valve between the shuttle valve top end and the shuttle valve bottom end;
  an engagement surface portion defined along the valve guide portion, the engagement surface portion configured to slidably engage with a valve bore defined within the control valve;
  a neck portion disposed between the shuttle valve bottom end and a first end of the valve guide portion, the neck portion having a diameter that is smaller than a diameter of the sealing portion of the control valve and smaller than a diameter of a second end of the valve guide portion, and the neck portion defining a valve chamber between the valve bore and the neck portion; and a non-engagement surface portion defined along the valve guide portion, wherein the non-engagement surface portion is a non-continuous surface around a circumference of the valve guide portion, wherein:

the engagement surface portion comprises a first engagement surface length extending axially and a second engagement surface length extending axially that is less than the first engagement surface length, the non-engagement portion is interspersed with the engagement surface portion along at least part of the first engagement surface length;

the first engagement surface length extends from an engagement surface end at the second end of the valve guide portion to the first end of the valve guide portion;

the second engagement surface length extends from the engagement surface end to the non-engagement surface portion; and the second engagement surface length is equal to an axial length of the non-engagement surface portion subtracted from the first engagement surface length.

2. The shuttle valve of claim 1, wherein the non-engagement surface portion is defined from a plurality of notches arrayed around the valve guide portion, and wherein each notch of the plurality of notches extends along the valve guide portion from the first end of the valve guide portion to the second engagement surface length of the engagement surface portion that is axially interior to the first end of the valve guide portion.

3. The shuttle valve of claim 2, wherein each notch of the plurality of notches extends along the axial length, the axial length is at least 2 millimeters from the first end of the valve guide portion.

4. The shuttle valve of claim 1, wherein the first engagement surface length and the second engagement surface length define an alternating pattern around the circumference of the valve guide portion.

5. The shuttle valve of claim 1, further comprising a second nonengagement surface portion that axially extends along the valve guide portion from the engagement surface end to the second end of the valve guide portion, wherein the second non-engagement surface portion defines a continuous surface around the circumference of the valve guide portion.

6. The control valve of claim 1, wherein the first length of the engagement surface portion and the second length of the engagement surface portion define an alternating pattern between the engagement surface portion and the non-engagement surface portion.

7. A control valve for an electronic fuel injector that selectively controls an amount of fuel supplied to the electronic fuel injector, the control valve comprising:

a fuel injector body including a valve bore extending through at least a portion of the fuel injector body;

an actuator selectably controllable to actuate the control valve to deliver the amount of fuel to the fuel injector;

a bushing inserted into the valve bore;

a shuttle valve slidingly engaged with the bushing and the shuttle valve operably coupled to an armature of the actuator such that actuation of the actuator causes an axial movement of the shuttle valve with respect to the bushing, the shuttle valve including:

a shuttle valve top end including an armature attachment portion to operably couple the shuttle valve to the armature;

a shuttle valve bottom end opposite the shuttle valve top end, the shuttle valve bottom end defining a sealing portion of the control valve including a shuttle valve terminal end surface and an annular sealing surface of the shuttle valve;

a valve guide portion axially extending along a portion of the shuttle valve between the shuttle valve top tip and the shuttle valve bottom tip;

an engagement surface portion defined along the valve guide portion, the engagement surface portion configured to slidably engage with the bushing inserted within the valve bore;

a neck portion disposed between the shuttle valve bottom tip and a first end of the valve guide portion, the neck portion having a diameter that is smaller than a diameter of the sealing portion of the control valve and smaller than a diameter of a second end of the valve guide portion, and the neck portion defining a valve chamber between the bushing and the neck portion; and a non-engagement surface portion defined along the valve guide portion, wherein the non-engagement surface portion is a non-continuous surface circumferentially defined around the valve guide portion, wherein:

the engagement surface portion comprises a first engagement surface length extending axially and a second engagement length surface extending axially that is less than the first axial length, the non-engagement portion is interspersed with the engagement surface portion along at least part of the first engagement surface length;

the first engagement surface length extends from an engagement surface end at the second end to the first end of the valve guide portion;

the second engagement surface length extends from the engagement surface end to the non-engagement surface portion; and the second engagement surface length is equal to an axial length of the non-engagement surface portion subtracted from the first engagement surface length.

8. The control valve of claim 7, wherein the bushing includes a sealing surface that is complimentary to the annular sealing surface of the shuttle valve, and wherein activation of the actuator causes the shuttle valve to move into a closed position such that the annular sealing surface of the shuttle valve and the sealing surface of the bushing are in direct contact with one another to form a fluid tight seal.

9. The control valve of claim 7, wherein the non-engagement surface portion is defined from a plurality of notches arrayed around the valve guide portion, and wherein each notch of the plurality of notches extends along the valve guide portion from the first end of the valve guide portion to an engagement surface location that is axially interior to the first end of the valve guide portion.

10. The control valve of claim 9, wherein each notch of the plurality of notches has a notch surface that is recessed below the engagement surface portion.

11. The control valve of claim 7, further comprising a second non-engagement surface portion that axially extends along the valve guide portion from the engagement surface end to the second end of the valve guide portion, wherein the second non-engagement surface portion defines a continuous surface around the circumference of the valve guide portion.

12. An internal combustion engine including a fuel system configured to deliver a fuel supply to a plurality of engine cylinders, the internal combustion engine comprising:

a plurality of electronic fuel injectors, each electronic fuel injector of the plurality of electronic fuel injectors including an injector body fluidly coupled to the fuel system and each engine cylinder of the plurality of cylinders; and a control valve integrated with the injector body of each electronic fuel injector of the plurality of electronic fuel injectors to selectively control the fuel supply delivered to the plurality of engine cylinders, the control valve including:

a valve bore extending through at least a portion of the fuel injector body;

a bushing inserted into the valve bore;

a shuttle valve extending axially through the valve bore and slidingly engaged with the bushing;

an actuator selectably controllable to actuate the control valve to deliver the fuel supply to each electronic fuel injector of the plurality of fuel injectors;

an actuator armature operably coupled to a shuttle valve top end such that actuation of the actuator causes an axial movement of the shuttle valve with respect to the bushing;

an annular sealing surface defined at a shuttle valve bottom end opposite the shuttle valve top end, and the shuttle valve bottom end defining a sealing portion of the shuttle valve including a shuttle valve terminal end surface and the annular sealing surface;

a valve guide portion axially extending along a portion of the shuttle valve between the shuttle valve top end and the shuttle valve bottom end;

an engagement surface portion defined along the valve guide portion, the engagement surface portion configured to slidably engage with the bushing inserted within the valve bore;

a neck portion disposed between the shuttle valve bottom end and a first end of the valve guide portion, the neck portion having a diameter that is smaller than a diameter of the sealing portion of the control valve and smaller than a diameter of a second end of the valve guide portion, and the neck portion defining a valve chamber between the bushing and the neck portion; and a non-engagement surface portion defined along the valve guide portion, wherein the non-engagement surface portion is a non-continuous surface circumferentially defined around the valve guide portion, wherein:

the engagement surface portion comprises a first engagement surface length extending axially and a second engagement surface length that is less than the first engagement surface length, the non-engagement portion is interspersed between at least part of the first engagement surface length;

the first axial length extends from the second end to an intermediate engagement surface portion;

the second engagement surface length extends from the engagement surface end of the valve guide portion to a first end of the valve guide portion; and the second engagement surface length is equal to an axial length of the non-engagement surface portion subtracted from the first engagement surface length.

13. The internal combustion engine of claim 12, wherein the bushing includes a sealing surface that is complimentary to the annular sealing surface of the shuttle valve, and wherein activation of the actuator causes the shuttle valve to move into a closed position such that the annular sealing surface of the shuttle valve and the sealing surface of the bushing are in direct contact with one another to form a fluid tight seal.

14. The internal combustion engine of claim 12, wherein the nonengagement surface portion is defined from a plurality of notches arrayed around the valve guide portion, and wherein each notch of the plurality of notches extends along the valve guide portion from the first end of the valve guide portion to an engagement surface location that is axially interior to the first end of the valve guide portion.

15. The internal combustion engine of claim 12, wherein the first length of the engagement surface portion and the second length of the engagement surface portion define an alternating pattern between the engagement surface portion and the non-engagement surface portion.

\* \* \* \* \*